(No Model.)
F. W. GOWELL.
ADJUSTABLE COUNTER SEAT.
No. 363,226. Patented May 17, 1887.
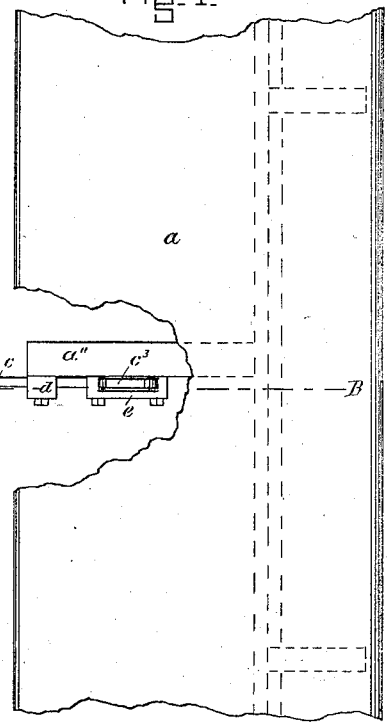
Fig. 1.
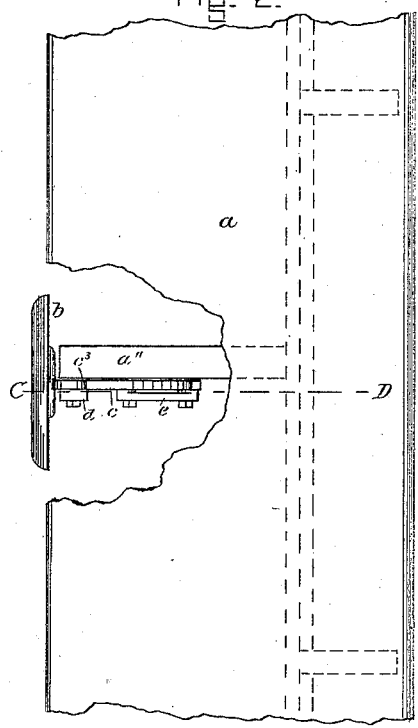
Fig. 2.
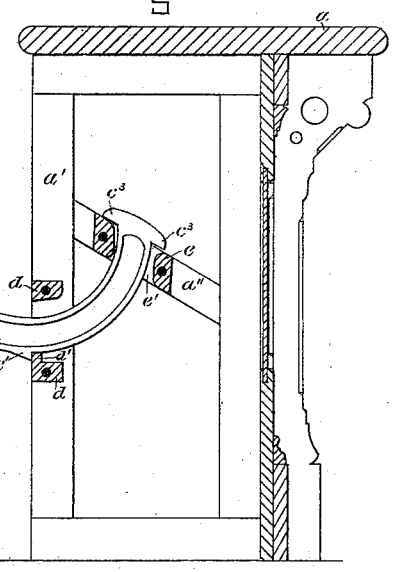
Fig. 3.
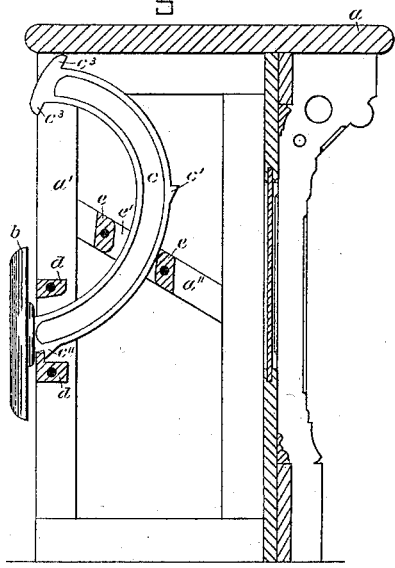
Fig. 4.
Fig. 5.
WITNESSES.
Charles H. Fogg.
Henry Chadbourn
INVENTOR.
Frederick W. Gowell
by Alban Andrew
his atty.

UNITED STATES PATENT OFFICE.

FREDERICK W. GOWELL, OF SOMERVILLE, ASSIGNOR TO CHARLES P. DEARBORN, OF BOSTON, MASSACHUSETTS.

ADJUSTABLE COUNTER-SEAT.

SPECIFICATION forming part of Letters Patent No. 363,226, dated May 17, 1887.

Application filed April 22, 1886. Serial No. 199,728. (No model.)

*To all whom it may concern:*

Be it known that I, FREDERICK W. GOWELL, a citizen of the United States, residing at Somerville, in the county of Middlesex and State of Massachusetts, have invented certain new and useful Improvements in Adjustable Counter-Seats; and I do hereby declare that the same are fully described in the following specification and illustrated in the accompanying drawings.

This invention relates to improvements in adjustable counter-seats to be used as temporary rests for clerks and shop-keepers in drygoods and other stores.

The invention is so constructed that when not required for use it may be swung out of position under the counter, as will hereinafter be more fully shown and described, reference being had to the accompanying drawings, where—

Figure 1 represents a plan view of the invention when in use. Fig. 2 represents a plan view of it when swung out of position beneath the counter. Fig. 3 represents a longitudinal section on the line A B, shown in Fig. 1, and Fig. 4 represents a longitudinal section on the line C D, shown in Fig. 2. Fig. 5 is a cross-section on line E F, shown in Fig. 3.

Similar letters refer to similar parts wherever they occur on the different parts of the drawings.

$a$ represents an ordinary counter or desk, on which $a'$ is one of the inner legs or supports, and $a''$ is one of the partitions or braces.

$b$ represents the seat, which is secured to the outer end of the curved metal bar $c$, as shown.

$d$ represents a slotted guide-piece for the curved bar $c$, such guide-piece being secured in a suitable manner to one of the posts $a'$, or other stationary inner part of the counter. $e$ represents a similar guide-piece for the inner end of the curved bar $c$, which guide-piece is secured to one of the braces or partitions $a''$ of the counter in a suitable manner. The lower part of the slotted guide $d$ has an upwardly-projecting locking-tooth, $d'$, which, in connection with the teeth $c'$ and $c''$ on the convex part of the curved bar $c$, serves as a locking device to retain the seat in position for use, as shown in Figs. 1 and 3, or when swung back out of use, as shown in Figs. 2 and 4.

The stationary guide $e$ has a recess or slotted perforation, $e'$, through which passes loosely the curved bar $c$, and in which it is guided while the seat is being swung outward or inward, as required. The inner or upper end of the curved bar $c$ is provided with one or more side projections or lips, $c^3 c^3$, (shown in Figs. 3 and 4,) that serve as stops to prevent the curved bar $c$ from being drawn out too far when the seat is required for use, as shown in Figs. 1 and 3, such stops or lips $c^3 c^3$ coming in contact with the upper portions of the stationary guide $e$, as fully shown in Fig. 3.

I prefer to make the curved bar $c$ of the double-T sectional form, as shown in Fig. 5, so as to make it as light as possible with increased strength both against a downward as well as a lateral breaking strain; but the sectional form of said curved bar $c$ may be changed according to the nature of the metal of which it is made.

When the seat is to be used, it is pulled out, as shown in Figs. 1 and 3, far enough to permit the tooth $c'$ to pass through the slotted guide-piece $d$ and to rest against the outside of the locking projection $d'$, as shown in Fig. 3, and when the seat is in this position it serves as a firm support for clerks or shop-keepers behind the counter. To remove the seat from the above-described position, as may be desired while waiting on customers, &c., it is only necessary to lift the seat $b$ and its arm $c$ sufficient to detach the tooth $c'$ from the locking projection $d'$ and to push the said seat and its curved arm inward until it comes in the position shown in Figs. 2 and 4, with the tooth $c''$ on the curved bar $c$ resting against the inside of the locking projection $d'$, as shown in Fig. 4.

This my invention is very simple and durable. It can be manipulated with great ease to serve as a seat when so desired, and as easily moved out of the way when not required for use, or when the clerk is waiting on customers, as herein set forth and described.

I am aware of the patents granted, respectively, to Merz, June 14, 1878, and Glynn and Goodman, September 26, 1871, and I wish to state that I do not claim the construction and arrangement as shown and described in said Letters Patent; but What I wish to secure by Letters Patent, and claim, is—

The herein-described adjustable counter-seat, consisting of the seat $b$, attached to the curved bar $c$, the latter having stop projection $c''$ directly below the seat, stop projection $c^3$ at the end of said bar $c$, and stop projection $c'$ about midway between its ends, combined with the stationary guides $d$ $e$, the former arranged in front below the counter, and the latter arranged below the counter above and back of the guide $d$, as and for the purpose set forth.

In testimony whereof I have affixed my signature in presence of two witnesses.

FREDERICK W. GOWELL.

Witnesses:
ALBAN ANDRÉN,
CHARLES S. FARQUHAR.